Dec. 16, 1969   D. E. HUMPHREY   3,483,991
SCREEN CENTRIFUGE APPARATUS
Filed May 7, 1969

INVENTOR.
Dean E. Humphrey
BY Edward A. Sager
ATTORNEY.

United States Patent Office 3,483,991
Patented Dec. 16, 1969

3,483,991
SCREEN CENTRIFUGE APPARATUS
Dean E. Humphrey, Lansdale, Pa., assignor to Pennwalt Corporation, Philadelphia, Pa., a corporation of Pennsylvania
Filed May 7, 1969, Ser. No. 822,500
Int. Cl. B01d 33/02, 33/00
U.S. Cl. 210—377                    10 Claims

ABSTRACT OF THE DISCLOSURE

A centrifuge having a screen with adjoining frusto-conical sections, one section having a larger angle of divergence than the other, is provided with a deflector and optional accelerator vanes to guide the feed along the surface of the screen.

This invention relates to screen centrifuges of the general type described in U.S. Patents Nos. 3,315,810 and 3,136,722, the disclosures of which are incorporated by reference herein.

Screen centrifuges known to the art usually comprise a frusto-conical screen having a constant angle of divergence to its rotational axis, and an axially extending feed pipe disposed within the screen for delivering feed to the smaller end of the screen. A plurality of substantially radially disposed feed-dispersing vanes may be mounted within the screen for rotation therewith, their construction being such as to deflect the feed outward and toward the smaller end of the screen.

It has been proposed to modify screen centrifuges by providing a screen having a larger angle of divergence at the larger or steep end of the screen than at the smaller or shallow end thereof, although both sections of the screen are of frusto-conical configuration and are preferably joined end to end intermediate the extreme ends of the screen where their angles intersect. It will suffice to say that a double angle screen centrifuge is advantageous in terms of separation efficiency for many applications, although high feed rates have presented a problem to which the present invention is addressed.

At high feed rates, the liquid fraction flows with increased axial velocity on a trajectory established by the shallow screen section at the smaller end of the screen. Instead of remaining in contact with the screen throughout its axial flow path until drained therethrough, a portion of the liquid fraction after traveling the length of the shallow screen section tends to jump at least part of the axial length of the steep screen section. Less effective drainage results from less contact with the screen, and a substantial amount of liquid may be discharged with solids through the discharge part adjacent the larger end of the screen.

According to the present invention a deflector disc or plate is provided within the screen and carried by the feed-dispersing and feed-accelerating vanes. The deflector plate is disposed, normal to the rotational axis of the screen, and with the peripheral edge of the plate in closely spaced relation to the screen at a point adjacent to, or downstream of, the intersection of the angles of the screen sections. Thus positioned and arranged, the deflector plate serves to deflect liquid from a shallow angled path conforming to the surface of the first travelled screen section to a steep angled path conforming to the surface of the other screen section.

Further provided, according to the invention, are optional secondary accelerator vanes on the deflector plate. These may be installed at circumferentially spaced locations at the periphery of the deflector plate, on the upstream and/or downstream sides of the plate for the purpose of increasing the tangential velocity of the feed coming into contact therewith. Since the velocity of the feed suffers some reduction due to deflecting contact with the deflector plate, it is desirable to restore at least a portion of the lost velocity through the action of the secondary accelerator vanes. But primarily the secondary accelerator vanes increase the tangential velocity of the feed to promote drainage of liquid through the screen. The rotation and angular inclination of the frusto-conical screen sections promote axial flow of feed material toward the larger end of the screen.

The objects of the invention will appear more fully from the following description and the drawings, of which:

Figure 1:
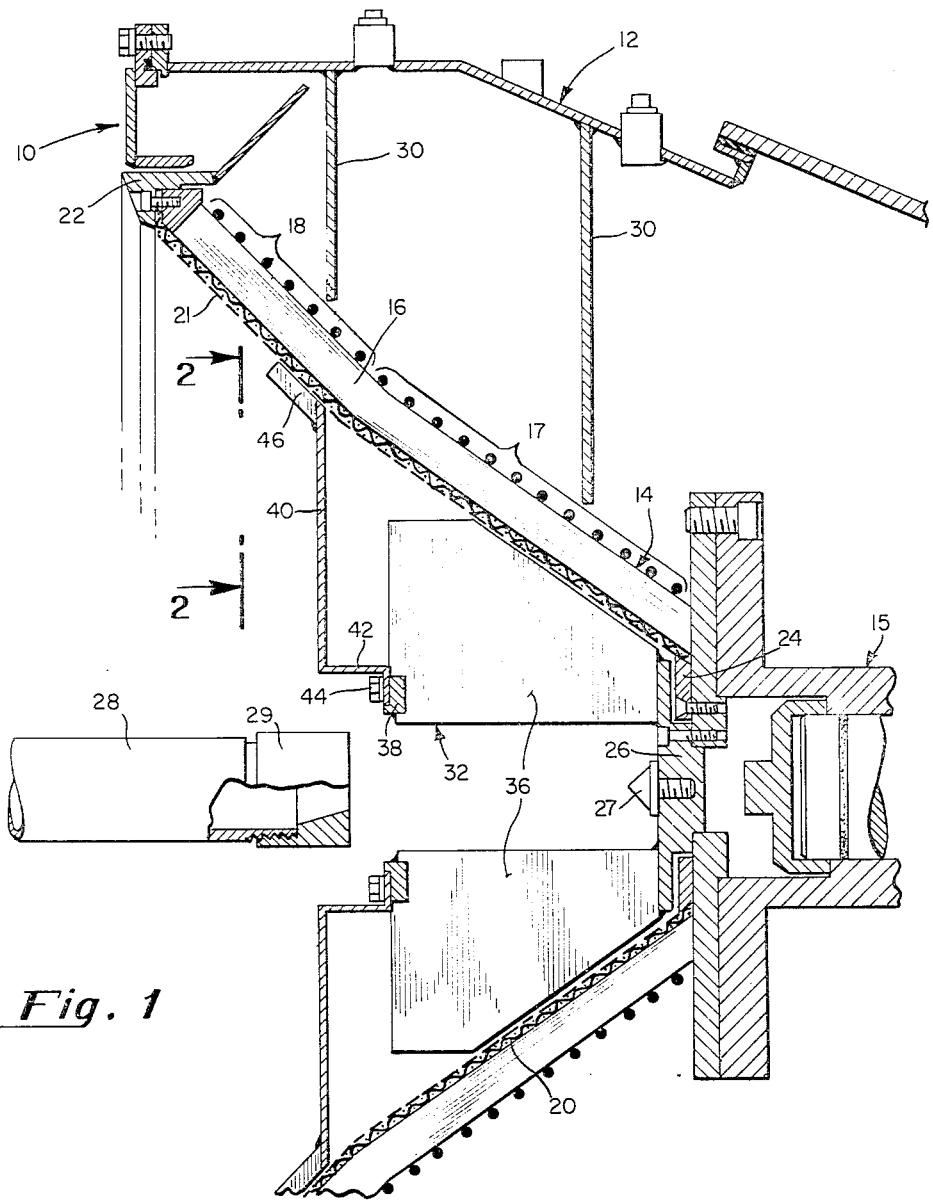
FIGURE 1 is a fragmentary, longitudinal sectional view of centrifuge apparatus embodying the invention, with portions shown in elevation.

The apparatus shown in FIGURE 1 is generally designated 10. It comprises a casing 12 in which is disposed a rotor including a centrifuge screen assembly 14. The assembly 14 is mounted on a shaft 15 which is supported by means not shown. Drive means (also not shown) are provided. In the embodiment shown in FIGURE 1 the assembly 14 includes a grating 16 having a shallow angled frusto-conical section 17 at the smaller end thereof and a steep angled frusto-conical section 18 at the larger end thereof, joined end to end in coaxial relationship.

The grating 16 preferably has mounted against its inside surface conformingly shaped screens of woven wire 20 for strength and of perforate sheet metal 21 for smoothness on the inwardly facing side. The ends of screens 20 and 21 are clamped in position by clamping rings 22 and 24 comprising part of the screen assembly 14. The rear wall 26 of the screen assembly may carry a target 27.

Feed means comprise a stationary feed tube 28, disposed within the screen assembly 14 mounted in coaxial relation thereto. The feed tube 28 is provided with a nozzle 29 which directs the feed along the axis to the target 27 and the small end of the screen assembly 14.

In operation the feed comprising solid and liquid components is deliquefied as it moves along the screen, the liquid passing through the screen assembly. Partitions 30 in the casing divide the flow-through from the screen assembly into desired fractions. Finally the deliquefied feed moves over the clamping ring 22 for collection.

To assist in moving the feed outward to the surface of the screen 21, a vaned weldment 32 is provided. In the illustrated embodiment the vaned weldment comprises the rear wall 26 to which are welded, or otherwise secured, a plurality of radially and axially disposed accelerator vanes 36. To the opposite ends of the accelerator vanes 36 a mounting ring 38 is secured, as by welding.

Focusing now on the specific area of the invention, a deflector disc or plate 40 is provided in the vicinity of the intersection of the shallow angled screen section 17 and the steep angled screen section 18. It is disposed in a plane normal to the axis. In the embodiment shown, the screen section 17 makes a 35 degree angle of divergence with its rotational axis, and the screen section 18 makes a 45 degree angle of divergence with the rotational axis, but the invention is not so limited. The difference in the angles of divergence of the two screen sections 17 and 18 may be at least 3 degrees. The large end of section 17 and the small end of section 18 are joined end to end along an annular line where their respective angles or extensions intersect, thereby presenting a smooth, uninterrupted screen surface from the small end to the large end of the assembly 14. The invention can be practiced with variations, however, and the indicated angles of divergence are merely illustrative.

In the preferred form of the invention, the deflector plate 40 is circular and provided with a central opening to permit passage of feed from the nozzle 29 to the area of target 27. Formed about the central opening in plate 40 is an annular flange 42 by which the plate 40 is suitably secured to mounting ring 38, as by an annular series of bolts 44. The peripheral edge of plate 40 is in closely spaced relation to the inwardly facing surface of the screen 21, adjacent the intersection of the adjoining screen sections 17 and 18; and preferably it is downstream of that intersection in projected line with the inwardly facing surface of the steep section 17 of screen 21.

The deflecting action of plate 44 will be understood from reference to FIGURE 1. As the feed moves axially and outwardly at a rapid rate along the inner surface of screen section 17, it has a tendency to continue in its path and then curve outwardly to a point intermediate the ends of screen section 18. Deflector plate 40 presents an obstacle in such path, deflecting the feed outwardly and slowing its rate of axial movement. The feed then tends to move along the surface of screen section 18, drainage therethrough being promoted.

Figure 2:
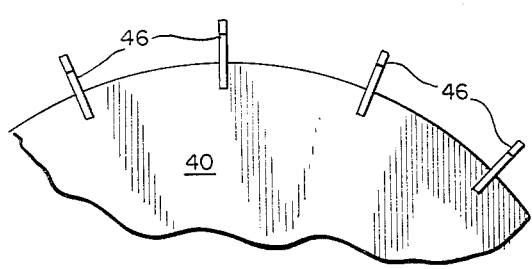
FIGURE 2 is a fragmentary end view of the apparatus shown in FIGURE 1, looking in the direction of the arrows associated with line 2—2.

As shown in FIGURES 1 and 2, optional secondary accelerator vanes 46 extending in radial direction may be circumferentially spaced about the peripheral edge of plate 40 on the downstream side thereof. The secondary accelerator vanes 46 may vary in number, 12 to 20 for example: they are preferably welded to the plate 40; and it is preferred that they extend along the adjacent surface of screen section 18. The secondary accelerator vanes 46 add velocity to the feed and propel the feed tangentially of the screen section 18, thereby furthering contact with the screen and promoting drainage therethrough.

Figure 3:
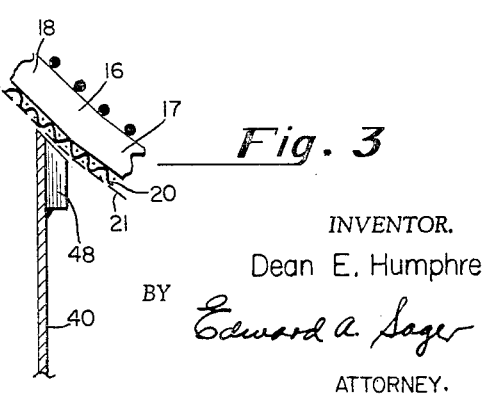
FIGURE 3 is a fragment of a view similar to FIGURE 1, but showing a modification thereof.

From the fragmentary illustration of FIGURE 3, it will be understood that additional radial accelerator vanes 48 may be installed on the upstream side of plate 40, similar in manner and spacing as the vanes 46 of the preferred embodiment, and for the same purpose. The additional vanes 48 are located close to the intersection of the screen sections 17 and 18 so that they are operative somewhat in advance of the other secondary vanes 46. The invention contemplates employment of the additional vanes 48 either instead of the secondary vanes 46 or together with the secondary vanes 46. In either case these vanes have broad, flat surfaces facing in the direction of rotation for transversely propelling any liquid contacted by them.

What is claimed is:

1. A screen centrifuge comprising a rotor including a screen formed about a rotational axis thereof, said screen including first and second frusto-conical sections arranged coaxially in end-to-end relationship, said second section making a larger angle of divergence to said axis than said first section, with the smaller end of said second section being joined to the larger end of said first section at the intersection of their respective inner surfaces, feed means disposed within the screen and adapted to deliver feed to the smaller end of said first section and a deflector plate carried by said rotor for rotation therewith with the peripheral edge of said plate closely spaced to said screen substantially adjacent to said intersection for deflecting feed from a first path extending from the inner surface of said first section to a second path along the surface of said second section.

2. A screen centrifuge according to claim 1 having the peripheral edge of the deflector plate positioned on the downstream side of said intersection.

3. A screen centrifuge according to claim 1 in which said first path is shallower relative to said axis than said second path.

4. A screen centrifuge according to claim 1 further including a plurality of feed-dispersing vanes mounted within said first screen section for rotation therewith and carrying said deflector plate.

5. A screen centrifuge according to claim 1 having a plurality of secondary accelerator vanes secured to the peripheral edge portion of said deflector plate.

6. A screen centrifuge according to claim 5 in which a plurality of said secondary accelerator vanes are circumferentially spaced about the downstream side of said plate in closely spaced relation to the inner surface of said second screen section.

7. A screen centrifuge according to claim 5 in which a plurality of said secondary accelerator vanes are circumferentially spaced about the upstream side of said plate in closer position to said intersection than said plate.

8. A screen centrifuge according to claim 5 in which secondary accelerator vanes are mounted on both sides of said plate.

9. A screen centrifuge according to claim 5 in which said secondary accelerator vanes are radially extending and have relatively broad flat surfaces facing in the direction of rotation.

10. A screen centrifuge according to claim 1 in which the peripheral edge portion of said deflector plate is positioned closer to said second section than said first section and is disposed generally in line with the inner surface of said first section.

References Cited

UNITED STATES PATENTS

| 2,312,829 | 3/1943 | Bird et al. | 210—380 X |
| 3,315,810 | 4/1967 | Humphrey et al. | 210—377 X |

JAMES L. DECESARE, Primary Examiner

U.S. Cl. X.R.

210—380